May 7, 1957 E. W. MASDEN 2,791,631
ASSOCIATED TELEPHONE AND PUBLIC ADDRESS SYSTEMS
Filed Nov. 16, 1955
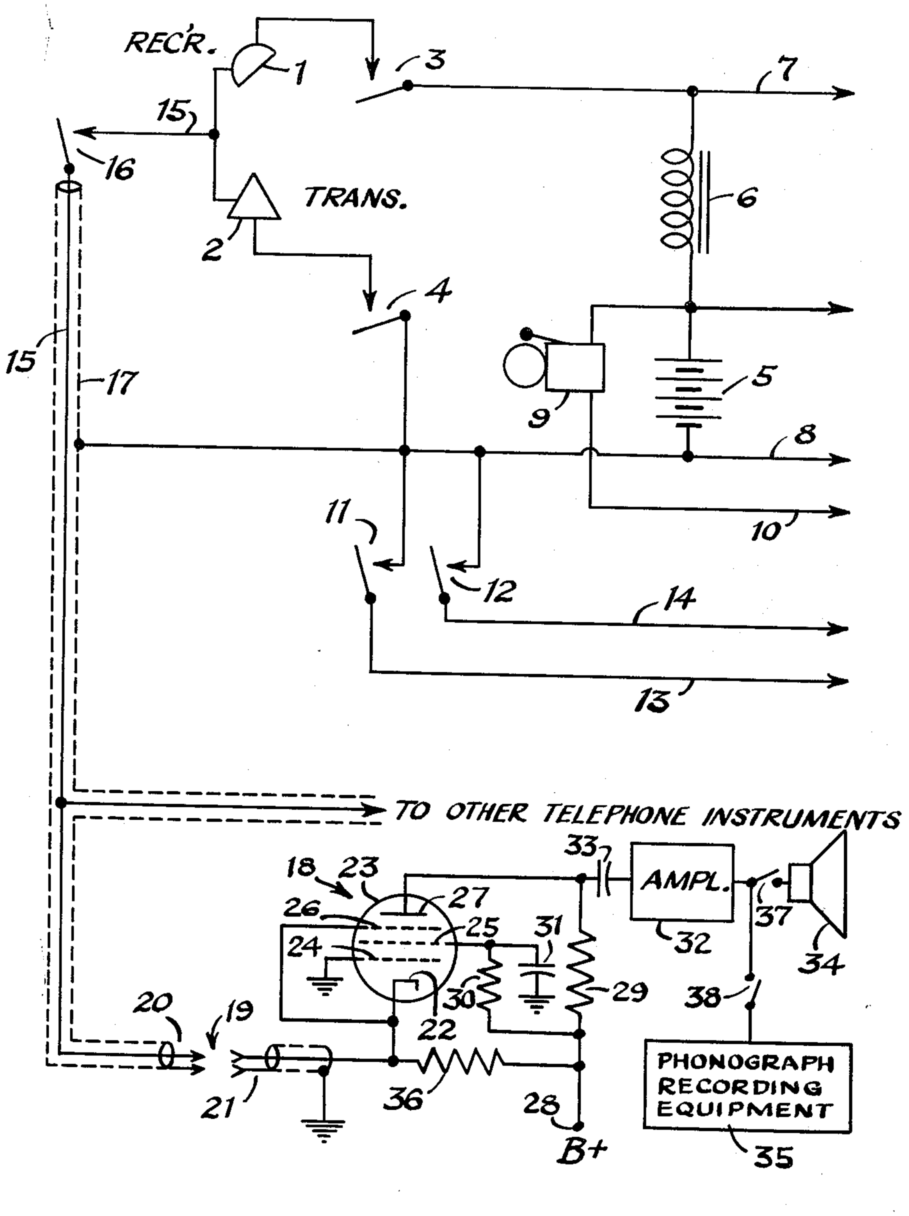
INVENTOR.
EARL W. MASDEN
BY Kegan and Kegan
Attorneys United States Patent Office 2,791,631
Patented May 7, 1957

2,791,631

ASSOCIATED TELEPHONE AND PUBLIC ADDRESS SYSTEMS

Earl W. Masden, Evanston, Ill., assignor to Private Telecommunications, Inc., Chicago, Ill., a corporation of Illinois Application November 16, 1955, Serial No. 547,277

7 Claims. (Cl. 179—1)

The present invention relates generally to telephone systems associated with public address systems, or with phonographic systems using plastic tape or wire recordings, and more particularly to novel arrangements for interconnecting a telephone system with a public address system or a phonographic device.

Briefly describing the present invention, a conventional telephone system is assumed to have been installed in a factory, office building, or the like, and it is assumed that it is desired to associate a public address system or a phonographic recording system with the telephone system, in such manner that the handsets or telephone instruments of the telephone system may be employed as the input microphones of the public address system or phonographic recording system. When a given handset is raised from its cradle, and a supplementary "talk" switch closed, the microphone of the handset is connected in the cathode circuit of the first stage of an audio amplifier of the public address system. The microphone, which is normally of the carbon type, is thus supplied with the cathode current normally flowing in the first stage of the audio amplifier, as its energizing current, and no external or supplementary source of energizing current is required. Moreover, the microphone, and its lead line to the amplifier, constitutes a relatively low resistance load, which matches well the cathode circuit of the amplifier, and avoids any necessity for an impedance matching transformer. The latter is required, and consequently a separate energizing source for the microphone, in systems which employ grid drive at the first stage of the amplifier, because of the mismatch existing between the microphone impedance and the tube input circuit impedance.

The control electrode or grid of the first stage of the amplifier is grounded, and the anode is resistance loaded in the usual fashion. The stage is, then, driven as a grounded grid plate-loaded amplifier, i. e. anode voltage variations occur in response to cathode potential variations, when the microphone is spoken into.

A high resistance is connected between a source of high positive voltage, for example the B+ voltage terminal, and the cathode. A "talk" switch is connected in the line between the cathode and the microphone. When the switch is open the cathode is disconnected from ground, and assumes the potential of the B+ terminal. Since the control grid is grounded, the first amplifier stage is cut off, and hiss, hum, noise and the like, which normally originate in the first stage of an amplifier, or in the lines leading thereto, are totally absent. When the switch is closed the microphone, and its lead line, form the cathode circuit of the first stage of the amplifier. The latter resistance being relatively small, the potential of the cathode decreases to a value slightly above ground, and the amplifier stage becomes operative.

In order to effect a paging or recording operation, accordingly, the person desiring to page lifts the handset or telephone instrument and closes the public address or "talk" switch. Everything he speaks into the telephone microphone is then announced by the public address speakers, or recorded in the recorder. When the switch is opened, the public address system or recorder system is disabled. The person paged then utilizes the nearest telephone of the telephone system to communicate personally with the person who has paged.

While I disclose my invention herein as applied to an interior telephone system, the arrangements disclosed also find application to automatic interior telephone systems, such as P. A. X, or to selective ringing, selective talking telephone systems, or to automatic dial systems, or the like.

It is, accordingly, an object of the present system to provide a novel mode of associating a public address systems with a telephone system.

It is a further object of the invention to provide a novel public address system in which the cathode current of a stage of a public address amplifier is employed as energizing current for a carbon microphone.

It is still another object of the invention to provide a grounded-grid, cathode-driven, anode-loaded amplifier stage in a sound delivery system such as a public address system or a disk-, tape-, or wire-playing phonograph or other playback device, wherein the microphone or other sound source of the sound originating system is connected directly in the cathode circuit of said stage.

Still another object of the invention resides in the provision of a public address system which employs as a microphone the telephone instrument of a telephone system, and in which the microphone requires no supplementary source of energizing current, the latter being supplied by the public address system in virtue of the mode of association of the first stage of the public address system with the microphone.

Still a further object of the invention resides in the provision of a grounded grid amplifier employing a microphone as a cathode driving source, and in which provision is made for automatically disabling the amplifier when the microphone is disconnected from the cathode, by raising the cathode potential to a relatively high fixed positive value.

The above and still further features, objects, and advantages of the invention will become apparent upon consideration of the following detailed description of a specific embodiment of the invention, especially when taken in conjunction with the accompanying drawings, wherein the single figure of the drawings is a schematic circuit diagram of a specific embodiment of the present invention.

Referring now more particularly to the accompanying drawings, the reference numeral 1 denotes a telephone receiver and the reference numeral 2 a telephone transmitter or microphone, of the carbon type, requiring D. C. operating current in the carbon element of the microphone. The combination is frequently denoted a handset. Associated with the receiver 1 and with transmitter 2 is a pair of switches, 3, 4, which are normally open and which are closed in response to raising of the receiver 1 and the transmitter 2 from their cradle, preparatory to communication. When switches 3 and 4 are closed, the receiver 1 and the transmitter 2 are connected in series with a source of D. C. voltage 5, conventionally illustrated as a battery, and further with an A. C. choke or retard coil 6. The latter provides isolation of the low impedance source 5, with respect to audio signals arriving via line 7, or transmitted via line 8, and enables the development of the requisite audio voltage by providing a high impedance audio load.

The bell 9 may be actuated, by completing a circuit between line 8, and a further ring line 10, through voltage source 5.

Remote bells may be selectively actuated by closure of switches 11, 12, one terminal of each of which is connected to common line 8, and the remaining terminals of which are connected respectively to lines 13, 14, which proceed to remote stations, and constitute the bell ringing circuits therefor, as the line 10 does for the illustrated station.

The lines 7, 8, and 10 may be interconnected with other stations, of the type illustrated, to form or provide a telephone system, which is per se conventional.

Connected to the telephone handset comprising receiver 1 and microphone 2, is a lead 15, in circuit with a switch 16. The switch 16 is normally open, and is closed to energize and actuate a public address system, a phonographic recorder, or the like. The line 15, as it extends beyond switch 16, is preferably shielded by a co-axial shield 17, which is permanently connected to the line 8.

The lines 15, 17 proceed to a remote location where the amplifier 18 may be located. Said amplifier 18 drives the loudspeakers of a public address system, or actuates a phonographic recorder. The lines 15, 17 terminate in a plug-in connector 19, preferably of the coaxial type, and specifically at the male element 20, thereof. The male element 20 may be connected with a female connector 21, the outer conductor of which is permanently grounded, grounding the shield 17, and the line 8. The inner lead, connected to line 15, extends to the cathode 22 of a pentode 23, or other suitable amplifier tube. The pentode 23 includes a control grid 24, a screen grid 25, a suppressor grid 26 and an anode 27. The control grid 24 is permanently connected to ground, and the suppressor grid 26 to the cathode. The anode 27 is connected to a B+ voltage terminal 28 via an anode load resistance 29, and the screen grid 25 is connected to B+ voltage terminal 28 via a resistance 30, which is bypassed by a condenser 31. The anode 27 is coupled to further amplifier stages 32, as required, via a coupling condenser 33. The last stage of amplifier stages 32 drives one or more public address speakers 34, or, if desired, a phonographic recording equipment 35.

A high resistance 36 is connected between B+ terminal 28 and cathode 22.

The operation of the system will now be described.

So long as the switch 16 is open, the transmitter 2 is disconnected from the amplifier 18, there is no cross talk introduced by one into the other, and the public address system is inoperative. Since the grid 24 is grounded, and the cathode 22 connected to a high positive voltage source, the pentode 23 is cut-off, eliminating hum and noise from the public address system, whether these originate in the line leading to the system or in the tube itself.

When the switch 16 is closed, preparatory to talking on the public address system, the handset ( and its transmitter 2) is raised, closing switch 4, and connecting the transmitter 2 to ground at one terminal, and to lead 15 at its other terminal. Since lead 15 is connected directly to cathode 22 of pentode 23, through connector 19, the transmitter 2, and the lead 15, become a cathode resistance for pentode 23, and the normal tube cathode current serves to energize the transmitter 2. Moreover, variations in resistance of the transmitter, occurring in response to voice actuation thereof, are communicated to pentode 23 as driving signal therefor, the control grid 24 being grounded and therefore remaining at fixed potential.

The cathode 22 being now connected to ground, its D. C. potential is reduced to a low positive value, despite its connection to B+ terminal 28, because of the high value of resistance 36, and the low value of the resistance of the microphone. A desirable bias is thus established for pentode 23, by suitable selection of the resistance value of resistance 36.

The direct connection of transmitter 2 to pentode 23, at its cathode, 22, implies efficient, effectively matched, operation. Were the transmitter 2 to drive a vacuum tube amplifier in its grid circuit, a serious mismatch of impedances would exist, unless an impedance matching transformer were employed, and the use of such a transformer would necessitate a separate source of D. C. power for operation of the carbon element of the transmitter 2.

The complete system of the present invention requires no modification of the telephone system with which it is associated, and utilizes the handsets in any event available in such systems. The public address system or phonographic recorder is completely and automatically cut-off at its first amplifier stage when not in operation, and it is rendered operative by the closure of a switch in the instrument or adjacent to it, or which may be incorporated in the handset or other sound delivery device.

The total current drain required by a carbon microphone is slight, so that the voltage drop introduced by even an extremely long length of line 15, 17 is of no consequence, and installations may be made without regard for the locations of public address amplifiers, at least in this respect.

Assuming that a conventional telephone system is available, a public address system or phonographic recording system in accordance with the present invention may be installed in association therewith. In order to page someone, the person paging lifts his telephone or handset, the terms being employed interchangeably herein, and closes the public address or "talk" switch. He speaks into the microphone, the spoken material going out over the public address system, or being recorded. When the announcement is completed, he releases the switch, disabling the public address system. The person paged then utilizes the telephone system by merely picking up the nearest instrument, which connects him automatically with the other raised instrument, in the hand of the paging person. The paged and paging persons may then converse privately.

The speakers 34, or the recording equipment 35, may be selectively or simultaneously placed in circuit by actuation of switches 37, 38.

By incorporating one or more additional telephone handsets or telephone instrument in the above described associated telephone and public address systems, as can easily be done by any person of ordinary skill in the art, private two-way and private multi-party conversations may be held through the telephone instruments; and paging through the public address system may originate at any telephone transmitter. Furthermore, any two-way or multi-party telephone conversation can be broadcast through the public address system, or recorded if desired.

While I have described and illustrated one specific example of the present invention it will be clear that variations of the specific details of construction may be resorted to without departing from the true spirit of the invention as defined in the appended claims.

What I claim is:

1. A combined telephone and audio output system, including a handset having a transmitter and a receiver, a telephone line, means for concurrently energizing the transmitter of said handset and connecting said handset to said telephone line, an audio output amplifier and transducer remote from said handset, a vacuum tube included in said amplifier, a line connecting said transmitter to said vacuum tube, said amplifier having a cathode, a control electrode and an anode, means connecting said line and said transmitter in series between said cathode and a point of reference potential, means for connecting said control electrode to a point of fixed reference potential, means including an anode voltage terminal for generating anode to cathode current flow of magnitude adequate to energize said transmitter, a resistance, relatively high in comparison with the resistance of said transmitter, connected between said voltage terminal and said cathode, and a switch in said line intermediate said cathode and said transmitter, whereby said vacuum tube is cut off when said switch is open and conductive when said switch is closed.

2. An audio system including a carbon microphone at one geographic location, and an amplifier tube at another remote geographic location, said amplifier tube including at least an anode, a cathode, and a control electrode, a long line connecting said carbon microphone to said cathode, a switch in series with said long line, and means responsive to closure of said switch for rendering said amplifier tube operative to amplify audio signals and responsive to opening of said switch for disabling said amplifier tube.

3. The combination in accordance with claim 2 wherein is provided a cathode load and a source of cathode voltage in series with said load and said cathode, whereby D. C. cathode current flows in said carbon microphone and said carbon microphone is energized by said D. C. current, and means connecting said control electrode to a source of fixed reference potential, whereby variations of resistance of said carbon microphone effect variations of anode current of said vacuum tube.

4. The combination in accordance with claim 3 wherein is provided means for raising said cathode to a relatively high positive voltage in response to opening of said switch.

5. The combination in accordance with claim 4 wherein said last means consists of a relatively high resistance connected between said source of anode voltage and said cathode.

6. The combination in accordance with claim 5 wherein is provided means for disconnecting said carbon microphone from said cathode, and means for raising said cathode to a relatively high D. C. positive potential in response to disconnection of said carbon microphone from said cathode.

7. The combination in accordance with claim 6 wherein said last means includes a source of said relatively high D. C. positive potential, and a relatively high resistance connected between said source and said cathode.

References Cited in the file of this patent

UNITED STATES PATENTS

| | | |
|---|---|---|
| 1,573,282 | Stone | Feb. 16, 1926 |
| 2,157,140 | Molin | May 9, 1939 |
| 2,463,229 | Wheeler | Mar. 1, 1949 |
| 2,764,632 | Adler | Sept. 25, 1956 |